Sept. 24, 1968 W. M. BOOTH 3,402,725
BULK TANK WASHING APPARATUS
Filed July 8, 1966 2 Sheets-Sheet 2
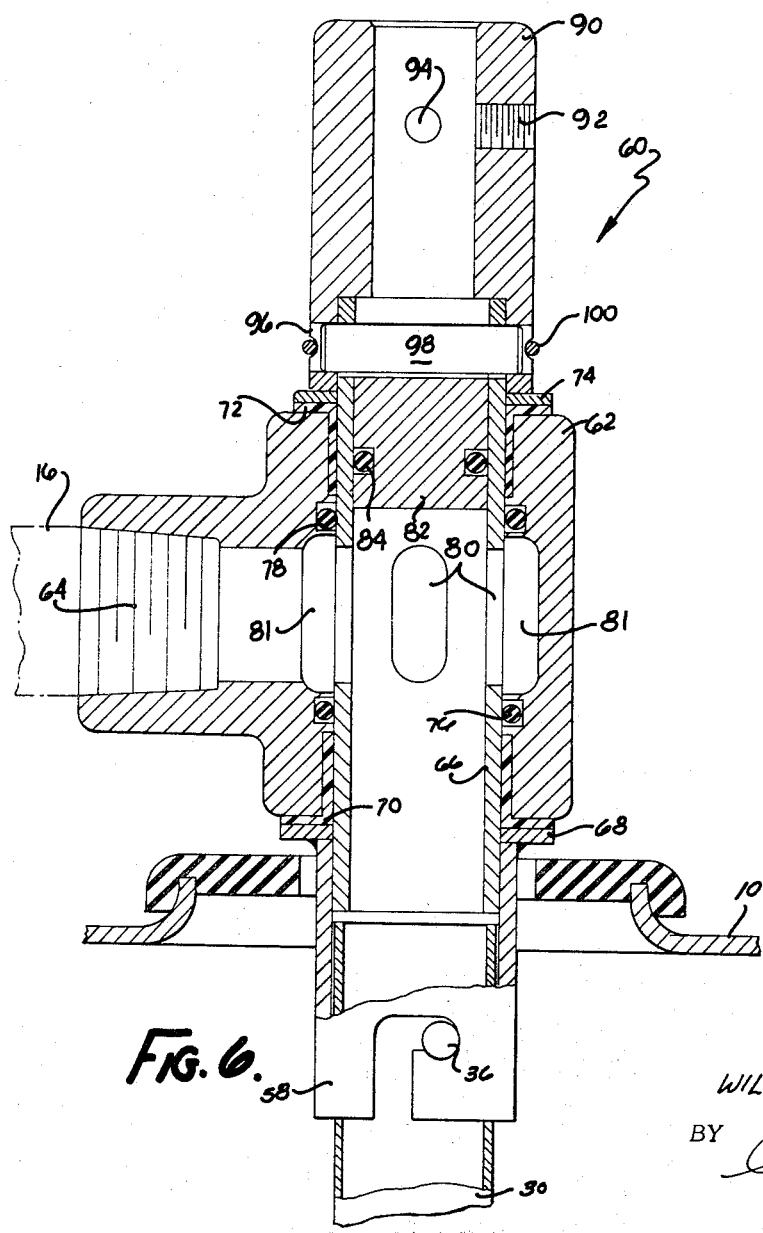
INVENTOR.
WILLIAM M. BOOTH
BY Price & Heneveld
ATTORNEYS

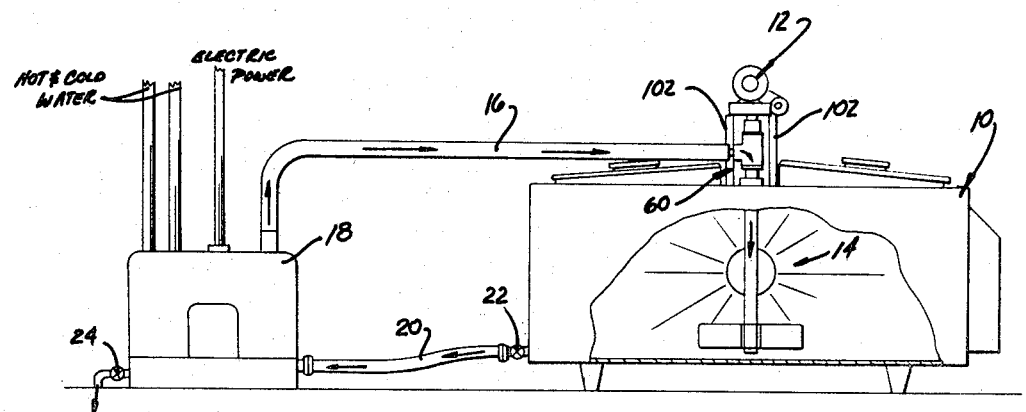
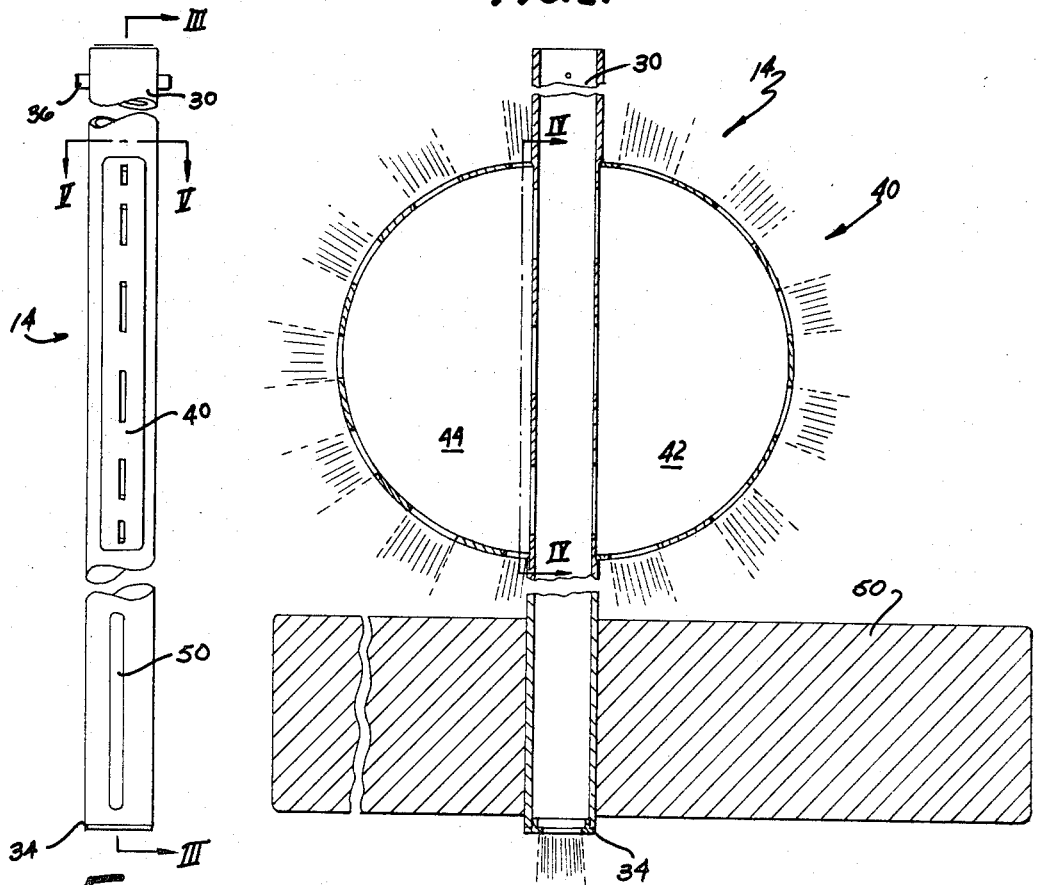

United States Patent Office 3,402,725
Patented Sept. 24, 1968

3,402,725
BULK TANK WASHING APPARATUS
William M. Booth, Grand Haven, Mich., assignor to Werner Machinery Company, Grand Rapids, Mich., a corporation of Michigan
Filed July 8, 1966, Ser. No. 563,810
7 Claims. (Cl. 134—167)

ABSTRACT OF THE DISCLOSURE

A spray structure for the interior of a bulk liquid storage tank or the like, including spray head means mounted on a hollow drive shaft and suspended inside the tank from a drive coupling which includes a T-shaped housing with a drive sleeve extending through the cross-arm portion of the housing and coupled on one end to the aforementioned drive shaft while being coupled on the other end to a driving means such as a motor and gear head. The leg portion of the T-shaped housing forms a fluid inlet port, and the drive sleeve has openings in its side wall through which fluid from such port may enter the hollow interior of the drive shaft.

---

This invention relates to bulk tanks for the storage of liquid such as milk, and more particularly it relates to a new and unique apparatus for automatically washing the interior of such a tank.

Bulk tanks have long been used for the storage of a number of liquids, and in the dairy industry such tanks are used to store milk, for example by using such a tank as a depository for the raw milk taken directly from the cows by an automatic milking system. Such bulk tanks are normally equipped with an agitator assembly consisting in essence of a bladed agitator head rigidly connected to a drive shaft which in turn depends downwardly into the tank from an electric motor and gear drive. The latter rotates the drive shaft at a slow rate of speed to steadily turn the agitator head and thereby continuously stir the milk within the tank to prevent it from stratifying, as is generally required by law.

When the milk is emptied out of such a bulk tank, it becomes necessary to wash the interior of the tank. The tank must of course be completely clean and free of all substances which could possibly contaminate the next batch of milk placed within the tank. The washing of these tanks has always been a problem, both with respect to obtaining the proper degree of cleanliness and also with respect to the amount of time and effort required to be spent. For a long time, the only really feasible way of washing these tanks was by hand, using hoses to flush the interior and long-handled brushes to actually scrub it. Despite its obvious limitations and drawbacks, this method is still in extensive use today, due to the absence of really suitable automated washing means.

In relatively recent times, it has been suggested that such tanks might be washed automatically by at least partially filling them with a series of desired washes and rinses and using the agitator to splash each such wash or rinse throughout the interior of the tank. Since typical agitators were designed only to slowly and steadily stir a large quantity of liquid, however, it was found that if this washing scheme was to work as intended, specially designed agitator heads would have to be provided which would throw the washing solutions high enough and far enough to do a proper cleaning job. Also, variable-speed drive means for the agitators had to be provided so that the specially designed agitator heads, which normally are driven very slowly in stirring the milk, could be driven at high speed during the washing operation, to provide the required turbulence in the washing solution which would assure proper cleaning of the tank. One such system as this is shown in U.S. Patent No. 2,873,722, issued to L. L. Duncan et al.

While the aforesaid splashing-type systems were a definite improvement over purely manual washing techniques, it was felt by many that the quality of the cleaning job which they provided was not as high as might be desired. Further, a new drive system was required by which the speed of the agitator could be varied. This factor served to elevate the cost of new tank assemblies which included the new equipment, and no provision was made for the conversion of old tanks having merely a conventional single speed agitator drive and an ordinary agitator paddle suspended within the tank. Furthermore, this type of cleaning system was designed and intended only for use in vacuum-type bulk tanks, i.e., bulk tanks of the type which are placed under vacuum during at least a portion of the time in which they are in use, whereas the vast majority of present-day bulk tanks are not of the vacuum type, but are instead atmospheric. Consequently, manual washing of such tank assemblies remained a practical necessity for a great many individuals.

It is a major object of the present invention to provide a new concept in the washing of bulk tanks, by which superior cleaning is achieved through a new type of structure equally applicable to old and new tank assemblies alike.

Another important object of the invention is to provide a spray-type bulk tank cleaning system, in which cleaning solutions are forced at relatively high velocities against the interior of the tank to completely clean the same.

Still another important object of the invention is to provide a spray-type cleaning system for bulk tanks in which a spray head positioned within the tank is driven in a programmed rotary motion assuring complete coverage and cleaning of the inside of the tank.

A further important object of the invention is to provide a programmed spray-type cleaning system of the aforesaid character, wherein the spray head is located at the geometric center of the bulk tank, for optimum spraying efficiency and cleaning results.

A still further important object of the invention is to provide a spray-type cleaning system for bulk tanks of the character indicated, wherein the spray head is an integral part of the agitator assembly, and wherein the agitator drive shaft includes a hollow interior providing a conduit for supplying cleaning solutions to a spray head mounted on the agitator shaft, which is made to be compatible with existing drive mechanisms and which requires absolutely no changes to be made in the same.

The foregoing major objects of the invention and the clear advantages attained thereby, together with other objects and advantages equally a part of the invention, will become apparent to those skilled in the art following a consideration of the ensuing specification and its appended claims, particularly when taken in conjunction with the accompanying illustrative drawings setting forth a preferred embodiment of the invention.

In the drawings:

FIG. 1 is a fragmentary side elevation of the complete washing system of the invention;

FIG. 2 is an enlarged, fragmentary side elevation of the agitator structure of the invention;

FIG. 3 is a sectional elevation taken through the vertical plane III—III of FIG. 2;

FIG. 4 is a fragmentary sectional elevation taken through the vertical plane IV—IV of FIG. 3;

FIG. 5 is a sectional overhead plan view taken through the horizontal plane V—V of FIG. 2; and FIG. 6 is an enlarged central section showing the connection of the agitator structure drive with the transfer means for the liquid cleaning solutions, and the coupling by which the said drive is connected to the conventional agitator drive motor.

Briefly stated, the concept involved in the present invention is to provide an agitator structure which includes an integral means for spraying cleaning solutions directly from the agitator assembly throughout the interior of the tank, so that when the tank has been emptied of milk, a controlled sequence of cleaning solutions may be pumped through the spraying means to thoroughly cleanse the interior of the tank without the requirement of any structural adjustments in the tank assembly whatsoever. The agitator assembly preferably includes an agitator head for stirring milk when the tank contains a quantity thereof, and also the spraying means mentioned, by which the tank may be cleaned when is contains no milk. Thus, the typical drive motor for the agitator assembly may be utilized for the washing procedure as well, to provide a controlled programmed rotation of the spraying means on the agitator assembly.

Referring now in more detail to the drawings, in FIG. 1 a typical bulk tank is seen at 10, which is intended to be exemplary only, and in connection with which the invention will be described. Almost all such tanks are equipped with an agitator of some nature driven by a conventional gear motor assembly 12, and the washing apparatus of the invention is intended for use with such conventional components, although of course it may be incorporated in newly designed tanks and agitator drives if so desired. The agitator structure of the invention is seen at 14 in FIG. 1, and it will be observed that this structure is not only coupled to the gear motor assembly 12, but also is coupled for fluid communication with a liquid-transferring conduit 16, which may be hose, tubing, or the like. The conduit 16 in turn is connected to a washer unit 18 which, for the purposes of the present invention, may be considered as a controllable or sequenced source of conventional design including hydraulic pumping equipment by which water supplied to the source may be pumped through the conduit 16.

The wash unit 18 is also coupled by a conduit 20 to a drain 22 in the bottom of the bulk tank 10, and it will be noted that the bottom of the wash unit is preferably lower than the bottom of the bulk tank 10, to facilitate rapid draining thereof, although this aspect is not a critical part of the present invention. The wash unit 18 is preferably provided with its own drain 24, by which washing solutions returned to the wash unit may be dumped, if so desired.

The nucleus of the present invention is centered in the agitator structure 14 and the manner of its construction, assembly, and operation. Whereas previous agitators were generally merely a blade or paddle secured to a solid drive shaft driven by a gear motor assembly, the agitator structure 14 of the present invention includes a hollow drive shaft 30 (FIGS. 2, 3, 4 and 5), a spray head 40 secured to the drive shaft and in flow communication with the interior of the latter, and a bladed agitator head 50 secured to the drive shaft 30 beneath the spray head, near the bottom of the drive shaft. The spray head 40 is most preferably formed from a pair of very similar hollow, flat, semicircular shells 42 and 44, each of which forms a half of the spray head. The shells 42 and 44 are preferably made from sheet stainless steel stock and, as the figures illustrate, each has the general form of a half disk which has a hollow interior and whose end or edge extremity is rounded in cross section (FIG. 5).

The shells 42 and 44 forming the spray head are securely fixed to the drive shaft 30 in a vertical orientation, and they extend radially from opposite sides of the drive shaft, in alignment with each other. As stated, the shells 42 and 44 are hollow, and in the area where each is to be secured to the drive shaft, a series of elongated apertures 32 (FIG. 4) are cut through the wall of the drive shaft, so that the interior of each shell will be in flow communication with the interior of the drive shaft. The shells are preferably welded in place over the flow apertures 32.

Around the rounded peripheral edge of each of the shells 42 and 44 are formed a series of elongated apertures or gashes which form spray outlets for cleaning liquids and solutions. As best seen in FIGS. 3 and 5, the outlet apertures in each of the shells are evenly spaced from each other, but the location of the outlets in each shell is not symmetrical to the location of the corresponding outlet in the other shell. That is, if these two shells were superimposed, the outlet openings would be seen to be staggered over the semicircular arc covered by either shell. The spray emanating from all of the outlet apertures is thus regularly spaced about the total periphery of the spray head 40, so that on each revolution of the drive shaft 30, the spray from each of the outlets in shell 42 will impinge upon an area wherein there was no comparable spray from shell 44, and conversely. Upon each complete revolution of the drive shaft, therefore, the complete area surrounding the spray head will have been sprayed, regardless of its shape. This particular staggered arrangement of spray apertures has been found to provide very good cleaning operation and this arrangement is regarded as the most preferred one. It is not, however, the only such arrangement which would provide adequate or satisfactory washing operation.

The bladed agitator head 50 (FIGS. 2 and 3) is preferably a solid paddle-like structure which may be very similar to similar such structures already in use. The agitator head is preferably made in two halves which are welded to the drive shaft 30 one hundred eighty degrees apart, in a manner generally similar to the construction of the spray head 40. The purpose of the agitator head, as already set forth, is merely to continuously gently stir or agitate milk being stored within the bulk tank, and consequently a simple paddle structure is entirely adequate for this purpose. However, it is to be expressly pointed out that the concept of this invention includes utilizing the position at the geometric center of the bulk tank, which is typically chosen for the paddle-like agitator, for the location of a spray head used in washing the inside of the bulk tank. Thus, while a separate spray head and agitator paddle have been shown and described, it is within the broader aspects of this concept to provide an agitator head having the general exterior shape of the head 50 illustrated herein, but which is actually constructed in much the same manner as the spray head 40 described above, so that the identical structure could be used both to stir milk when it is present within the bulk tank, and also to act as a spray head for spraying cleaning solutions on the inside of the tank when no milk is present therein.

The main reason why such a construction is not the most preferred one is that the agitator paddle should be located near the bottom of the bulk tank, where rotation will serve to stir any quantity of milk placed in the tank, including small portions which cover only the bottom extremity of the tank. On the other hand, the preferred location for the internal spray head is approximately at the center of the tank enclosure, where the spray head is equidistant from all oppositely-disposed points within the tank. Consequently, the spray head is most preferably mounted at about the midpoint of the drive shaft and somewhat above the agitator head, and this is illustrated in the figures.

When the foregoing agitator and spray head configuration is used, it is to be noted that it is useful to align the planes of the spray head 40 and agitator head 50 with each other, so that the bottom spray outlets in the spray head will send water or other cleaning liquids directly against the top of the agitator head, to thereby thoroughly clean the same. This water of course continues onward over the agitator head to clean those portions of the tank lying therebeneath. Also, it is to be noted that the bottom end of the drive shaft 30 is preferably closed with a circular plug 34 (FIGS. 2 and 3), which preferably has a slotted outlet port formed in it, so that water and other cleaning liquids will be sprayed directly from the bottom of the drive shaft at the same time that they are being sprayed from the spray head 40.

The top of the drive shaft 30 is drilled to receive a transverse pin 36 (FIGS. 2 and 3), which preferably is welded securely in place. The central portion of the pin 36 may be reduced or necked-down in cross section, so as not to present any undue restriction of the flow of liquids passing through the inside of the drive shaft. The pin 36 provides the means for mounting or suspending the drive shaft 30 and the entire agitator structure 14 within the bulk tank, through a slideable engagement with a pair of oppositely-disposed inverted J-shaped slots formed in a sleeve coupling 58 (FIG. 6). This is the normal way of mounting a conventional drive shaft and paddle-like agitator. Conventionally, however, the slotted coupling connects directly to the output of the gear motor assembly 12, whereas in the present invention the coupling 58 forms the lowermost extremity of a combined drive coupling and liquid transfer unit 60 (FIG. 6) which provides mechanical coupling to the gear motor assembly 12 and which also connects the conduit 16 from the wash unit 18 seen in FIG. 1 to the hollow interior of the drive shaft 30 to provide flow communication therebetween.

The coupling and transfer unit 60 has an outer housing 62 shaped generally like a T-type pipe coupling and having a fluid inlet 64 which preferably has internal pipe threads for engagement with the conduit 16. The housing 62 has a vertical bore which is in open communication with the inlet 64, and which slideably receives an elongate tubular drive sleeve 66 having an outer diameter that is very nearly the same as that of the drive shaft 30. It is to be noted, however, that a slight clearance is present between the outside of the drive shaft 30 and the inside of the drive coupling 58. The purpose for this will appear more fully hereinafter. The lower end of the drive sleeve 66 slides inside the upper extremity of the sleeve coupling 58 and is secured thereto as by welding. Also, before the drive sleeve is slid into the housing 62, a flat thrust washer 68 is slid over the drive sleeve to rest against the upward end of the coupling 58, where it is welded to the latter.

Thus, when the drive sleeve 66 is slid upward through the housing 62, the housing will be supported by the thrust washer. However, to reduce the friction between the housing and thrust washer and also to reduce the friction between the housing and the drive sleeve 66 which is rotatable therewithin, a flanged cylindrical nylon bearing 70 is placed within an appropriate relief formed in the bore of the housing, at the bottom extremity thereof, so that the flanged portion of the nylon bearing lies between the bottom extremity of the housing and the upper face of the thrust washer 68. Flanged bearings of this nature are conventionally available, and are sold under the tradename "Nyliner." A similar such bearing 72 is inserted into the top of the housing 62, and an upper thrust washer 74 is slideably fitted over the top of the drive sleeve 66 to rest upon the upper surface of the bearing 72. Within the housing 62, a pair of O-ring seals 76 and 78 seat in annular recesses formed within the bore of the housing, to seal the outside of the drive sleeve 66 relative to the housing. It will be noted that the drive sleeve 66 has a series of elongated apertures 80 formed therein between the O-ring seals 76 and 78 and in alignment with the inlet 64 in the outer housing. Also, the interior of the housing 62 defines an annular cavity 81 which is in alignment and flow communication with the inlet 64 and which surrounds that portion of the drive sleeve 66 in which the elongated apertures are formed. These apertures are preferably spaced ninety degrees apart around the sleeve, so that regardless of the rotation of the drive sleeve within the housing, one such aperture will always be in almost direct alignment with the said inlet. The spacing of the elongated apertures 80 and the presence of the annular cavity 81 surrounding the latter assures the continuous passage of liquid from the conduit 16 through the inlet 64, into the drive coupling 66, and thus into the interior of the drive shaft 30.

The top of the drive sleeve 66 is sealed from upward fluid movement by the presence of a cylindrical plug 82 having an O-ring seal 84 seated in an annular recess about the periphery of the plug. Friction between the sides of the plug and the inside of the drive sleeve is adequate to hold the plug from slipping downwardly within the sleeve, but it is advisable to retain the plug against upward movement caused by the pressurized cleaning solutions passing through the drive sleeve, which naturally exert an upward force upon this plug. In the preferred embodiment, a means for retaining the plug is made integral with the connection of a drive coupled 90 to the top of the drive sleeve 66. Drive coupling 90 is a cylindrical sleeve having a main longitudinal bore of a size which will universally accept the output shaft of known agitator drive gear motor assemblies. It has been found that such shafts do not vary widely from one source to another, and that a bore in the drive coupling 90 of three-fourths inches will operate very satisfactorily. The drive coupling is drilled and tapped at 92 and 94 so that set screws may be utilized to lock it onto the output shaft of the gear motor assembly.

The bore at the lower extremities of the drive coupling 90 is enlarged to accept the upper portion of the drive sleeve 66. Drive coupling 90 has a transverse hole 96 drilled therethrough near its bottom, and the top of the drive sleeve has a similar hole through it. Consequently, a locking pin 98 may be slid through both the drive coupling 90 and the drive sleeve 66 when their respective holes are in register to lock these two members together against both longitudinal and rotational stresses. Also, the presence of locking pin 98 acts to retain the cylindrical plug 82 in position near the top of the drive sleeve against upwardly-directed forces exerted by the pressurized washing liquids. Locking pin 98 is retained in place by the presence of a snap ring 100 which fits into an angular groove formed circumferentially about the bottom of the drive coupling 90 at the center of its hole 96.

*Operation*

Having detailed the structure and the assembly of the present invention, its operation will likely already be appreciated. In conventional bulk tank assemblies, the agitator drive gear motor asembly 12 (FIG. 1) is normally mounted directly above the top of the bulk tank 10, with the conventional agitator shaft connecting directly to the output shaft of the gear motor assembly. In using the present agitator structure washing assembly, whether it is used to convert existing conventional equipment or in a new installation, the gear motor assembly 12 is mounted in a raised position above the top of the bulk tank 10 by the use of appropriate stand-offs or mounts 102 (FIG. 1), which may take any desired form such as for example the cylindrical rods which are illustrated. Thus, the downwardly-depending output shaft from the gear motor assembly 12 acts as a suspension member for both the driver assembly 60 and the entire agitator structure 14, which depends downwardly from the driver assembly due to the fixed connections provided by the locking pin 98 and the coupling sleeve 58 and transverse drive shaft pin 36.

With the components assembled as shown in FIG. 1, milk or other liquids may be stored in the bulk tank 10 in the usual manner, and the agitator head 50 may be driven by the gear motor assembly 12 in the desired manner to stir the stored milk and prevent its stratification.

In this operation, the connection of conduit 16 to the inlet 64 of the driver assembly housing 62 will hold the said housing in the position shown while the gear motor assembly rotates the drive coupling 90, the connecting or locking pin 98, the drive sleeve 66, and the coupling sleeve 58 secured to the latter, thereby rotating the drive shaft 30 and the agitator head 50 connected thereto. When this occurs, relative rotation is present between the driver assembly housing 62 and the drive sleeve 66, and this is greatly facilitated by the friction-reducing effects of the two flanged nylon bearings 70 and 72.

When the milk is drained from the bulk tank and it is desired to wash the same, this is very easily accomplished by merely actuating the wash unit 18 to pump desired cleaning liquids or solutions through the conduit 16 at a desired pressure. Such solutions then pass through the driver assembly and its drive sleeve 66, into the interior of the drive shaft 30, and directly into the spray head 40. These solutions are then sprayed out of the spray head in the staggered pattern already discussed, to impinge against the walls of the bulk tank and clean them with a vigorous scrubbing action. Also, it will be remembered that the cleaning liquids are similarly sprayed directly out of the bottom of the drive shaft 30, through a slot in the plug 34, whereby the cleaning of the lower extremities of the tank is facilitated. Further, the minute clearance between the drive shaft and the drive coupling 58 noted previously permits a light spray of cleaning solution to pass through this clearance and then down the outside of the drive shaft, thereby cleaning the drive shaft at the same time that the interior of the bulk tank is being sprayed.

The drive shaft 30 and spray head 40 are, of course, steadily rotated by the gear motor assembly 12 at the same time that the cleaning solutions are being sprayed into the interior of the tank, and consequently the entire interior surface of the tank is completely sprayed with the cleaning solutions during each revolution of the drive shaft. Needless to say, this produces a very efficient washing action which is far superior to what has been previously attainable either through brushing and spraying by hand or by filling the bulk tank at least partially with cleaning solutions and splashing such solutions over the interior of the tank. As the cleaning liquids are steadily sprayed from the spray head 40, they strike the interior walls of the bulk tank and pass to the bottom of the tank, from which they are steadily drained through the drain valve 22 of the tank and through the conduit 20 back to the wash unit 18, from which they may be recirculated if desired or drained and dumped out of dump valve 24.

The superiority of the present device and the many desirable benefits provided thereby will be immediately appreciated by those skilled in the art. The device is completely sanitary, since not only does it thoroughly wash the interior of the bulk tank from top to bottom, but also the portions of the agitator structure 14 which contact the milk in normal operation are all smoothly rounded, with no corners or crevices in which bacteria may collect and multiply. This is also true of the interior of the spray head 40, which is smoothly curved throughout, as may be seen from FIGS. 3, 4, and 5.

After having become familiar with the present disclosure, it is entirely conceivable that those skilled in the art may devise embodiments of the invention which differ in minor details from the preferred embodiment shown and described herein or may modify certain structural details of this particular embodiment. All such further embodiments or different structures as do not depart from the spirit of the invention and are clearly based on the underlying concept thereof are thus to be considered as within the scope of the claims appended herebelow, unless these claims by their language expressly state otherwise.

I claim:
1. Apparatus for washing the interior of a bulk liquid storage tank, comprising in combination: a spray structure including spray head means and a hollow drive shaft for rotatably mounting the latter; a drive coupling for suspending said drive shaft inside such tank and for imparting rotary motion to the drive shaft while supplying liquid thereto for spraying within the tank; said coupling including a generally T-shaped housing defining a pair of aligned cross-arm ports and a third port in flow communication with said cross-arm ports; said coupling further including a rotatable drive member within said housing extending between said pair of cross-arm ports; said drive member having mounting structure at its opposite ends for attachment of said drive shaft to one of such ends and attachment of a driving means to the other such end; said third port forming an inlet for admitting fluids to the interior of said housing; and said housing and said drive member cooperating to form a fluid passage which communicates with said hollow drive shaft, to pass fluids from the interior of said housing into said shaft.

2. The apparatus of claim 1, wherein said rotatable drive member extending between said cross-arm ports comprises a sleeve-like tube, said tube having generally hollow internal portions comprising said fluid passage which communicates with said hollow drive shaft.

3. The apparatus of claim 2, wherein said sleeve-like tube has at least one opening in its side wall disposed generally in alignment with said third port in said housing, said opening providing fluid flow into the interior of said tube.

4. The apparatus of claim 3, wherein said housing and said tube cooperate to define an annular passage circumferentially encircling said tube in proximity with said opening in said tube wall, said annular passage providing a path for fluid circulation around said tube.

5. The apparatus of claim 2, wherein the said mounting structure at the said one end of said drive member for attachment thereto of said drive shaft comprises with the upper extremity of said drive shaft a relatively slideable releasable interconnection, whereby said drive shaft is readily removable from its attachment to said drive member.

6. The apparatus of claim 1, wherein said drive shaft is hollow throughout its length and defines at least one spray aperture at its bottom extremity, liquid from within said drive shaft being sprayed outwardly through such aperture toward the bottom of said tank.

7. The apparatus of claim 1, wherein said coupling defines a fluid discharge opening disposed to discharge fluid from within said housing onto the outside of said hollow drive shaft, to clean the same.

References Cited

UNITED STATES PATENTS 2,954,038   9/1960   Girard _____ 134—167
1,557,240   10/1925  Butterworth.

FOREIGN PATENTS 233,478   4/1961   Australia.
26,377    1/1954   Finland.

ROBERT L. BLEUTGE, *Primary Examiner.*